(12) United States Patent
Benson et al.

(10) Patent No.: US 9,449,408 B2
(45) Date of Patent: Sep. 20, 2016

(54) VISUALIZING HIGH-CARDINALITY DATA

(71) Applicant: SAS Institute Inc., Cary, NC (US)

(72) Inventors: Jordan Riley Benson, Ellerbe, NC (US); David J. Caira, Chapel Hill, NC (US); Douglas R. Dotson, Pittsboro, NC (US); Lisa Hope Everdyke, Cary, NC (US); Nascif A. Abousalh-Neto, Cary, NC (US)

(73) Assignee: SAS Institute Inc., Cary, NC (US)

( * ) Notice: Subject to any disclaimer, the term of this patent is extended or adjusted under 35 U.S.C. 154(b) by 78 days.

(21) Appl. No.: 14/206,477

(22) Filed: Mar. 12, 2014

(65) Prior Publication Data

US 2015/0029213 A1     Jan. 29, 2015

Related U.S. Application Data

(60) Provisional application No. 61/858,413, filed on Jul. 25, 2013, provisional application No. 61/860,974, filed on Aug. 1, 2013.

(51) Int. Cl.
*G09G 5/00*     (2006.01)
*G06T 11/20*     (2006.01)

(52) U.S. Cl.
CPC .................................... *G06T 11/206* (2013.01)

(58) Field of Classification Search
CPC ..... G09G 5/14; G06T 15/005; G06T 11/206; G06T 11/40; G06T 11/203; G06T 11/20
USPC ............ 345/418, 440, 440.2, 441, 442, 443, 345/472, 501, 619, 620, 621, 625
See application file for complete search history.

(56) References Cited

U.S. PATENT DOCUMENTS

| | | | |
|---|---|---|---|
| 6,707,454 B1* | 3/2004 | Barg et al. ..................... | 345/440 |
| 2003/0009399 A1* | 1/2003 | Boerner .................. | G06F 17/18 705/35 |
| 2003/0014420 A1* | 1/2003 | Jessee et al. .................. | 707/101 |
| 2008/0288525 A1* | 11/2008 | Leikucs ............ | G06F 17/30286 |
| 2010/0235771 A1* | 9/2010 | Gregg, III ...................... | 715/769 |
| 2011/0074786 A1* | 3/2011 | Aggarwal ..................... | 345/440 |
| 2012/0151417 A1* | 6/2012 | Wong ................ | G06F 17/30442 715/851 |
| 2014/0267424 A1 | 9/2014 | Benson et al. | |

OTHER PUBLICATIONS

Y. Benjamini, Opening the Box of a Boxplot, The American Statistician, vol. 42, No. 4, Nov. 1988, pp. 257-262.

(Continued)

*Primary Examiner* — Xiao Wu
*Assistant Examiner* — Sarah Lhymn
(74) *Attorney, Agent, or Firm* — Bell & Manning, LLC

(57) ABSTRACT

A method of visualizing high-cardinally data is provided. A graph is presented on a display. The graph includes a first axis, a second axis, and a plurality of value markers. The first axis includes a minimum value and a maximum value and the second axis includes a plurality of category values. A selection indicator identifying selection of a first value marker of the plurality of value markers is received. The first value marker indicates a value for a category value of the plurality of category values. A second plurality of category values is determined based on the category value. The graph and a second graph are presented on the display. The second graph includes a third axis, a fourth axis, and a second plurality of value markers. The third axis includes a second minimum value and a second maximum value.

32 Claims, 15 Drawing Sheets

(56) References Cited

OTHER PUBLICATIONS

IBIS-PH—Test of Proportions, updated Jan. 17, 2012, Downloaded from http://ibis.health.state.nm.us/resources/TestofProportions.html on Sep. 27, 2013, pp. 1-4.
Interactive Statistical Graphics: the paradigm of linked views, Chapter 16 in Handbook of Statistics: Data Mining and Data Visualization, edited by Rao et al., Elsevier, 2005, pp. 506-507.
S. Few, Coordinated Highlighting in Context Bringing Multidimensional Connections to Light, Perceptual Edge, Jul. 2010, pp. 1-23.
GGobi data visualization system, Downloaded from http://www.ggobi.org/ on Sep. 27, 2013, pp. 1-3.
Im et al., GPLOM: The Generalized Plot Matrix for Visualizing Multidimensional Multivariate Data, IEEE Transactions on Visualization and Computer Graphics, vol. 19, No. 12, Dec. 2013, pp. 2606-2614.
Tools—WikiViz, last modified Jul. 19, 2013 Downloaded from http://www.wikiviz.org/wiki/Tools on Sep. 27, 2013, pp. 1-5.
M. Theus, Mondrian—Interactive Statistical Graphics in JAVA, Jun. 3, 2011, Downloaded from http://rosuda.org/Mondrian/Mondrian.html on Sep. 27, 2013.
M. Theus, About Mondrian, Aug. 29, 2013, pp. 1-35.
Visulab Screenshots, (2005) Institute of Computational Science, ETH Zurich (Switzerland), Downloaded from http://www.inf.ethz.ch/personal/hinterbe/Visulab/sub/screenshots.html on Oct. 4, 2013, pp. 1-2.
Rios-Berrios et al., TreeCovery: Coordinated dual treemap visualization for exploring the Recovery Act, Government Information Quarterly, vol. 29, No. 2, 2011, pp. 212-222.
Tableau Releases 8.0 with 90+ New Features to Help People Create, Collaborate and Captivate With Data, Mar. 21, 2013, Downloaded from http://www.tableausoftware.com/about/press-releases/2013/tableau-releases-v8-90-new-features-help-people-create-collaborate on Sep. 3, 2013.
Free Visualization Software | Free Analysis Software | Free Analytics, (2013) InetSoft Technology Corp., Downloaded from http://www.visualizefree.com/visualizations.jsp on Nov. 20, 2013, pp. 1-16.

\* cited by examiner

VISUALIZING HIGH-CARDINALITY DATA

CROSS-REFERENCE TO RELATED APPLICATIONS

The present application claims the benefit of 35 U.S.C. §119(e) to U.S. Provisional Patent Application Nos. 61/858,413 filed on Jul. 25, 2013, and 61/860,974 filed on Aug. 1, 2013, the entire contents of which are hereby incorporated by reference.

BACKGROUND

Computational processes are widely-used to analyze, understand, integrate, and transform data. Visualization techniques are used to present the data for evaluation and analysis of the data.

SUMMARY

In an example embodiment, a method of visualizing high-cardinality data is provided. A graph is presented on a display. The graph includes a first axis, a second axis, and a plurality of value markers. The first axis includes a minimum value and a maximum value. The second axis includes a plurality of category values. A selection indicator identifying selection of a first value marker of the plurality of value markers is received. The first value marker indicates a value for a category value of the plurality of category values. A second plurality of category values is determined based on the category value. The graph and a second graph are presented on the display. The second graph includes a third axis, a fourth axis, and a second plurality of value markers. The third axis includes a second minimum value and a second maximum value.

In another example embodiment, a computer-readable medium is provided having stored thereon computer-readable instructions that, when executed by a computing device, cause the computing device to perform the method of visualizing high-cardinality data.

In yet another example embodiment, a computing device is provided. The system includes, but is not limited to, a processor and a computer-readable medium operably coupled to the processor. The computer-readable medium has instructions stored thereon that, when executed by the computing device, cause the computing device to perform the method of visualizing high-cardinality data.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
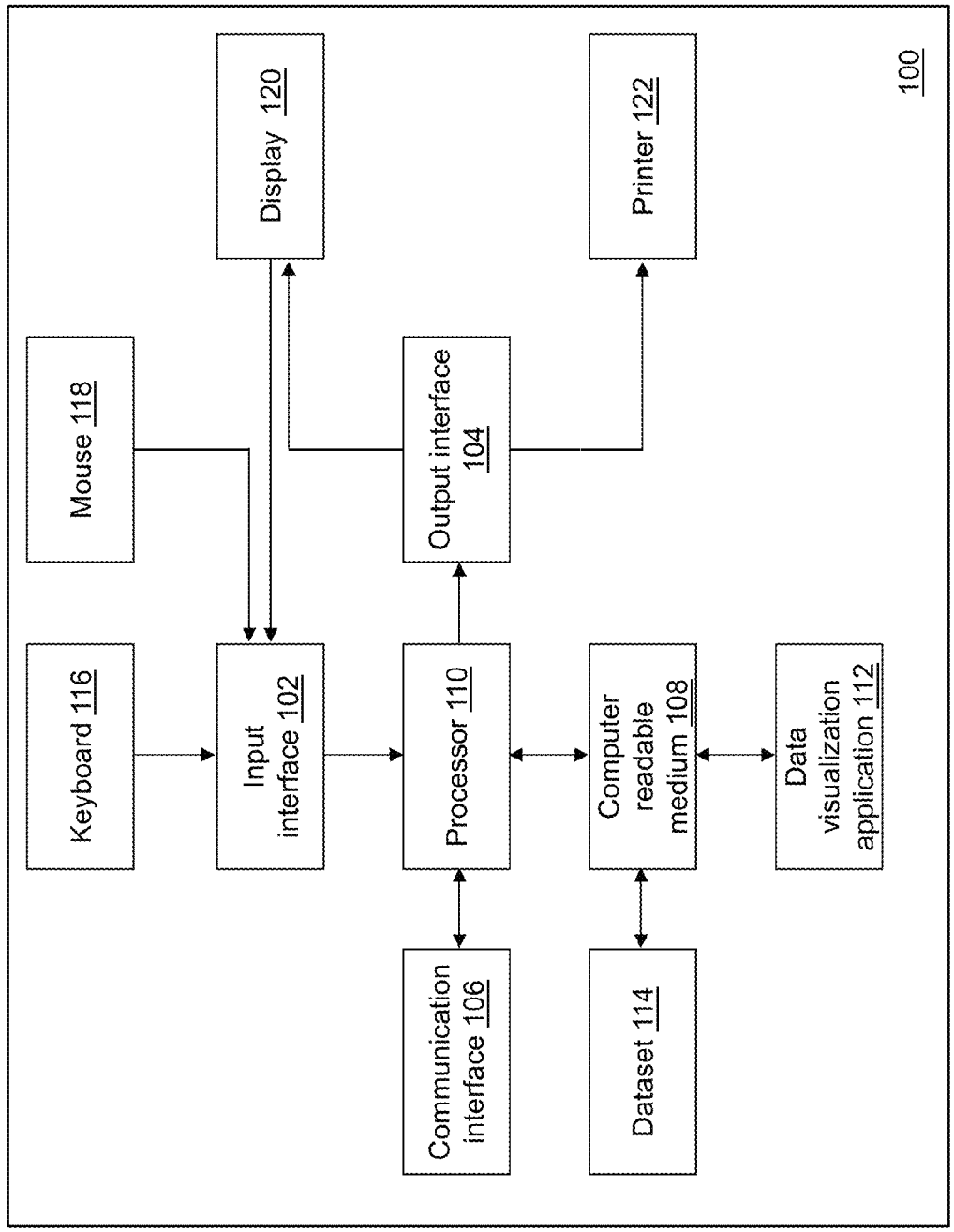
FIG. 1 depicts a block diagram of a data visualization device in accordance with an illustrative embodiment.

Referring to FIG. 1, a block diagram of a data visualization device 100 is shown in accordance with an illustrative embodiment. Data visualization device 100 may include an input interface 102, an output interface 104, a communication interface 106, a computer-readable medium 108, a processor 110, a data visualization application 112, and dataset 114. Fewer, different, and/or additional components may be incorporated into data visualization device 100.

Input interface 102 provides an interface for receiving information from the user for entry into data visualization device 100 as understood by those skilled in the art. Input interface 102 may interface with various input technologies including, but not limited to, a keyboard 116, a mouse 118, a display 120, a track ball, a keypad, a microphone, one or more buttons, etc. to allow the user to enter information into data visualization device 100 or to make selections presented in a user interface displayed on the display. The same interface may support both input interface 102 and output interface 104. For example, a touch screen display supports user input and presents output to the user. Data visualization device 100 may have one or more input interfaces that use the same or a different input interface technology. The input interface technology further may be accessible by data visualization device 100 through communication interface 106.

Output interface 104 provides an interface for outputting information for review by a user of data visualization device 100. For example, output interface 104 may interface with various output technologies including, but not limited to, display 120, a printer 122, etc. Data visualization device 100 may have one or more output interfaces that use the same or a different output interface technology. The output interface technology further may be accessible by data visualization device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data visualization device 100 may have one or more communication interfaces that use the same or a different communication interface technology. For example, data visualization device 100 may support communication using an Ethernet port, a Bluetooth antenna, a telephone jack, a USB port, etc. Data and messages may be transferred between data visualization device 100 and other computing devices using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data visualization device 100 may have one or more computer-readable media that use the same or a different memory media technology. Data visualization device 100 also may have one or more drives that support the loading of a memory media such as a CD, DVD, an external hard drive, etc. One or more external hard drives further may be connected to data visualization device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data visualization device 100 may include a plurality of processors that use the same or a different processing technology.

Data visualization application 112 performs operations associated with providing one or more visualizations generated from dataset 114. Some or all of the operations described herein may be embodied in data visualization application 112. The operations may be implemented using hardware, firmware, software, or any combination of these methods. Referring to the example embodiment of FIG. 1, data visualization application 112 is implemented in software (comprised of computer-readable and/or computer-executable instructions) stored in computer-readable medium 108 and accessible by processor 110 for execution of the instructions that embody the operations of data visualization application 112. Data visualization application 112 may be written using one or more programming languages, assembly languages, scripting languages, etc.

Data visualization application 112 may be implemented as a Web application. For example, data visualization application 112 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Dataset 114 includes a plurality of observations (rows) based on one or more data variables (columns). Dataset 114 may be transposed in alternative embodiments. Dataset 114 includes columns that include numeric valued variables and categorical valued variables that may be represented in various computer-readable data formats such as binary, alphanumeric, numeric, string, etc.

Dataset 114 may be stored in computer-readable medium 108 and/or on one or more other computing devices and accessed using communication interface 106. For example, dataset 114 may be stored in a cube distributed across a grid of computers as understood by a person of skill in the art. Dataset 114 may be stored using various file formats as known to those skilled in the art including a file, a file system, a relational database, a system of tables, a structured query language database, a cube, etc.

Figure 2:
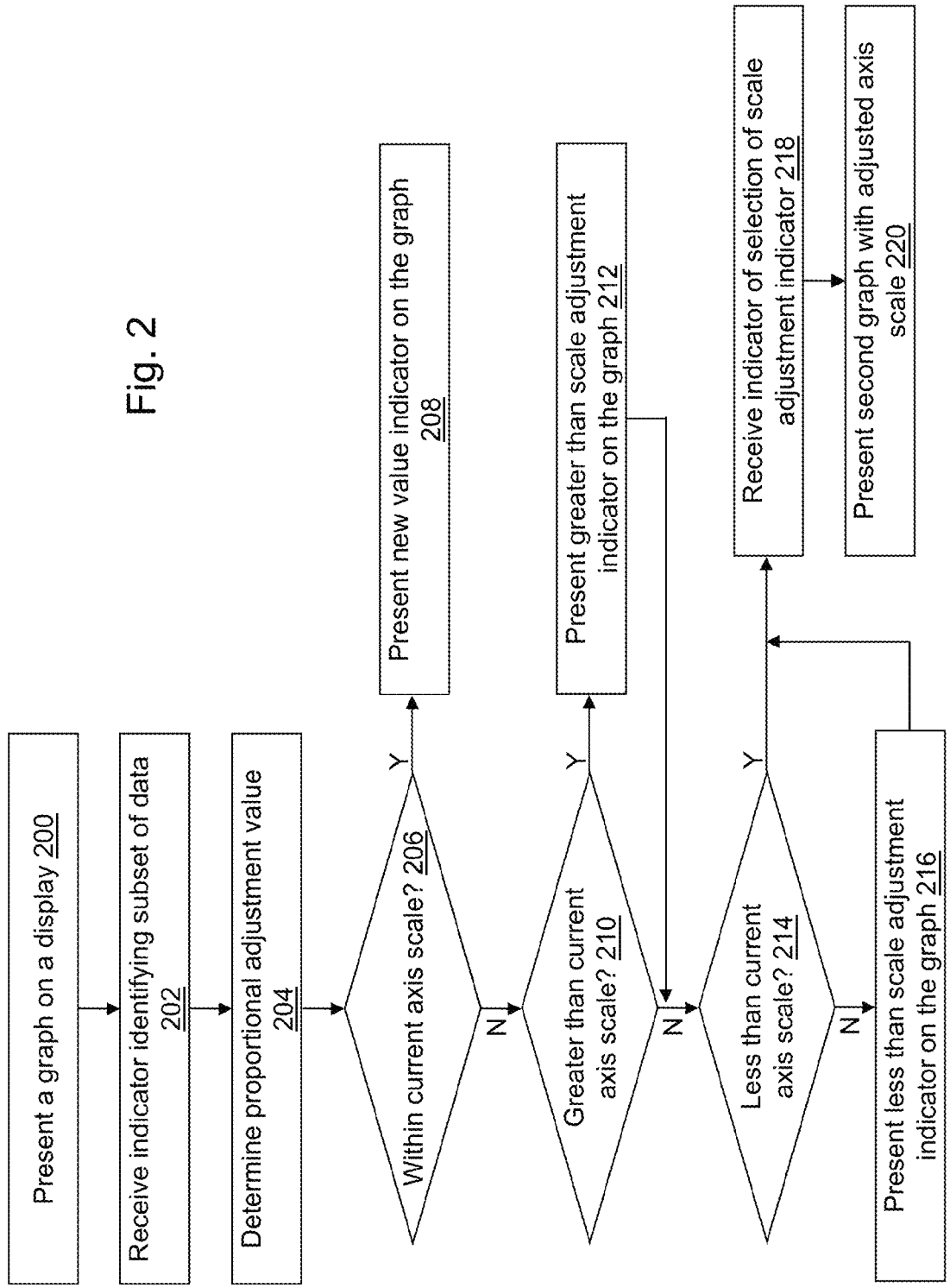
FIG. 2 depicts a flow diagram illustrating examples of operations performed by the data visualization device of FIG. 1 in accordance with an illustrative embodiment.

Referring to FIG. 2, examples of operations performed by data visualization application 112 to provide proportional highlighting of dataset 114 are shown. Referring to FIG. 2, example operations associated with data visualization application 112 are described in accordance with a first illustrative embodiment. Additional, fewer, or different operations may be performed depending on the embodiment. The order of presentation of the operations of FIG. 2 is not intended to be limiting. Although some of the operational flows are presented in sequence, the various operations may be performed in various repetitions, concurrently (in parallel, for example, using threads), and/or in other orders than those that are illustrated. For example, a user may execute data visualization application 112, which causes presentation of a first user interface window, which may include a plurality of menus and selectors such as drop down menus, buttons, text boxes, hyperlinks, etc. associated with data visualization application 112 as understood by a person of skill in the art. As a result, the user may interact with the user interface resulting in a different order of operations than those described in FIG. 2. As used herein, an indicator indicates one or more user selections from a user interface, one or more data entries into a data field of the user interface, one or more data items read from computer-readable medium 108 or otherwise defined with one or more default values, etc.

Figure 3:
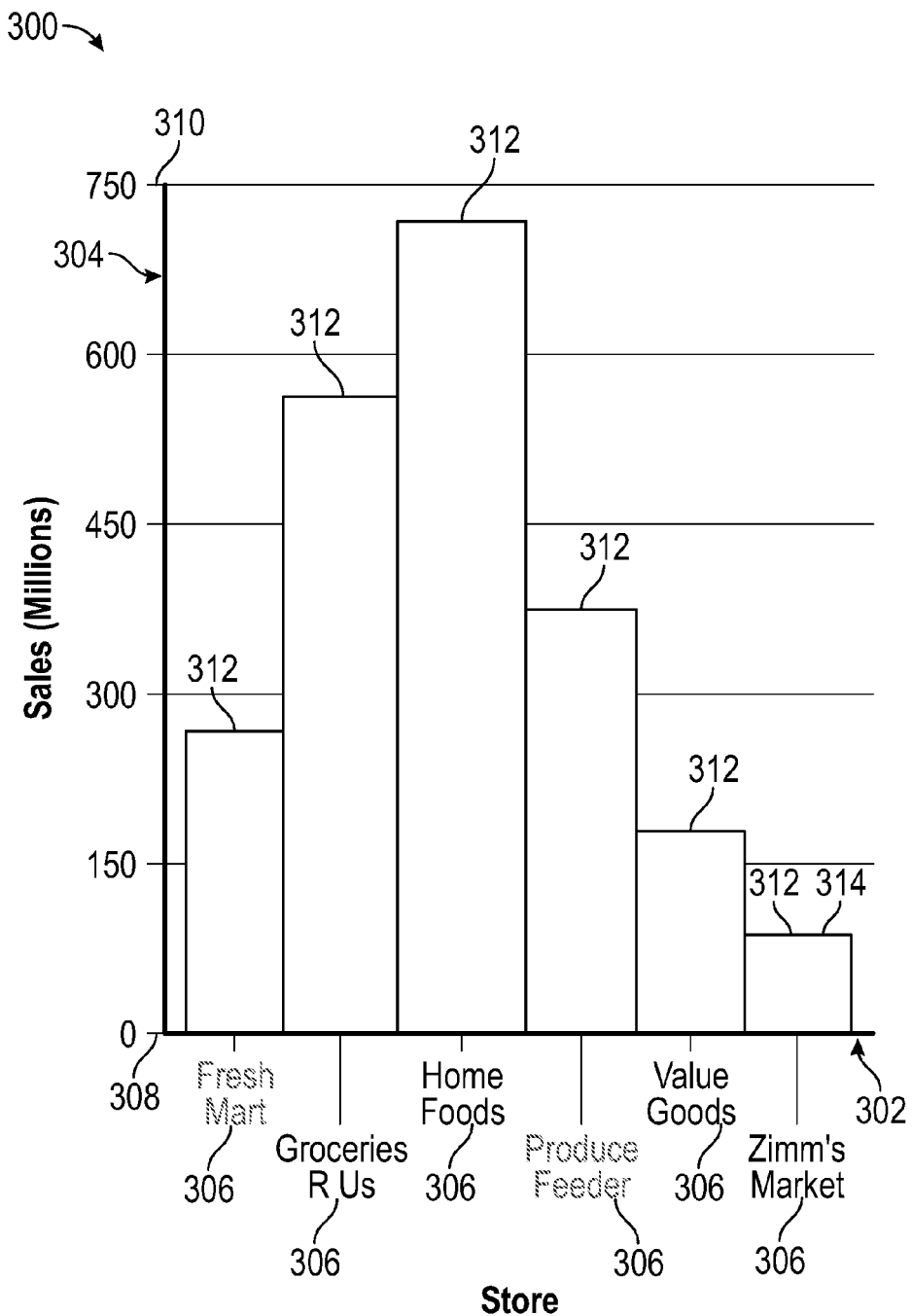
FIGS. 3-9 illustrate proportional highlighting of data performed by the data visualization device of FIG. 1 in accordance with illustrative embodiments.

In an operation 200, a graph is presented on display 120. For example, the graph may be a bar graph, a histogram, a binned bar graph, a density plot graph, a kernel density estimation plot graph, a pie graph, a tree map, a bubble graph, etc. Any graph where aggregated data is mapped to the dimensions of an element in the graph may be used. A bar graph uses either horizontal or vertical bars to show comparisons among categorical values. A first axis of the bar graph shows categories that are being compared. A second axis represents a discrete value associated with the specific categories. For example, referring to FIG. 3, a bar graph 300 is shown in accordance with an illustrative embodiment.

Bar graph 300 includes a first axis 302 and a second axis 304. First axis 302 includes a plurality of category labels 306 distributed along first axis 302. In the illustrative embodiment, the plurality of category labels 306 is grocery store chains. Second axis 304 includes a minimum value 308 and a maximum value 310 and represents a response value for the associated category value. In the illustrative embodiment, minimum value 308 is zero and maximum value 310 is 750, and the response value represents total average sales by the respective grocery store chain in millions of dollars. A plurality of intermediate values may be defined between minimum value 308 and maximum value 310.

In the illustrative orientation, first axis 302 extends from minimum value 308 of second axis 304 in a horizontal direction and second axis 304 is in a vertical direction. First axis 302 and second axis 304 may be reversed in an alternative embodiment. Additionally, first axis 302 may extend from maximum value 310 of second axis 304 in an alternative embodiment. Additionally, second axis 304 may extend from an opposite end of first axis 302 in an alternative embodiment.

Bar graph 300 further includes a plurality of value markers 312. In the illustrative embodiment, the plurality of value markers 312 are bars having a height in the vertical direction that corresponds to a second axis value of a respective category value. For example, a first value marker 314 indicates an average sales value of approximately 75 million for a category value (grocery store chain) of "Zimm's Market". Other types of value markers may be used in alternative embodiments including solid or dashed lines at the second axis value of the associated category value. The bars may be filled or not filled. When filled, the bars may be filled with various colors, textures, patterns, etc.

A histogram is similar to a bar graph except that second axis 304 of a histogram shows a frequency value for each bar. The height of each bar represents a frequency density for the associated category value. A histogram may also be normalized to present relative frequencies.

A binned bar graph is similar to a bar graph, but is created by sorting the categories by the response value, binning adjacent bars into groups of equal numbers of rows, and plotting the result as a line chart connecting the average of each bar. Minimum and maximum lines are shown to capture an error introduced by the binning and to represent the range of values in each bar. In general, the groups may be un-named though labels could be assigned based on the range of values within each group.

Bar graph 300 is presented based on a subset of dataset 114 selected for graphing as understood by a person of skill in the art. The subset may be all or a portion of the observations and/or all or a portion of the columns included in dataset 114. For example, a user may filter dataset 114 to identify the subset of data to graph in bar graph 300. For example, the grocery store chains shown may have been selected by the user by indicating a filter based on a region location. A user may indicate a column that defines values to graph relative to first axis 302 and a column that defines values to graph relative to second axis 304. One or more filter parameters may be applied to the data in each column to further limit the data included in the subset.

Figure 4:
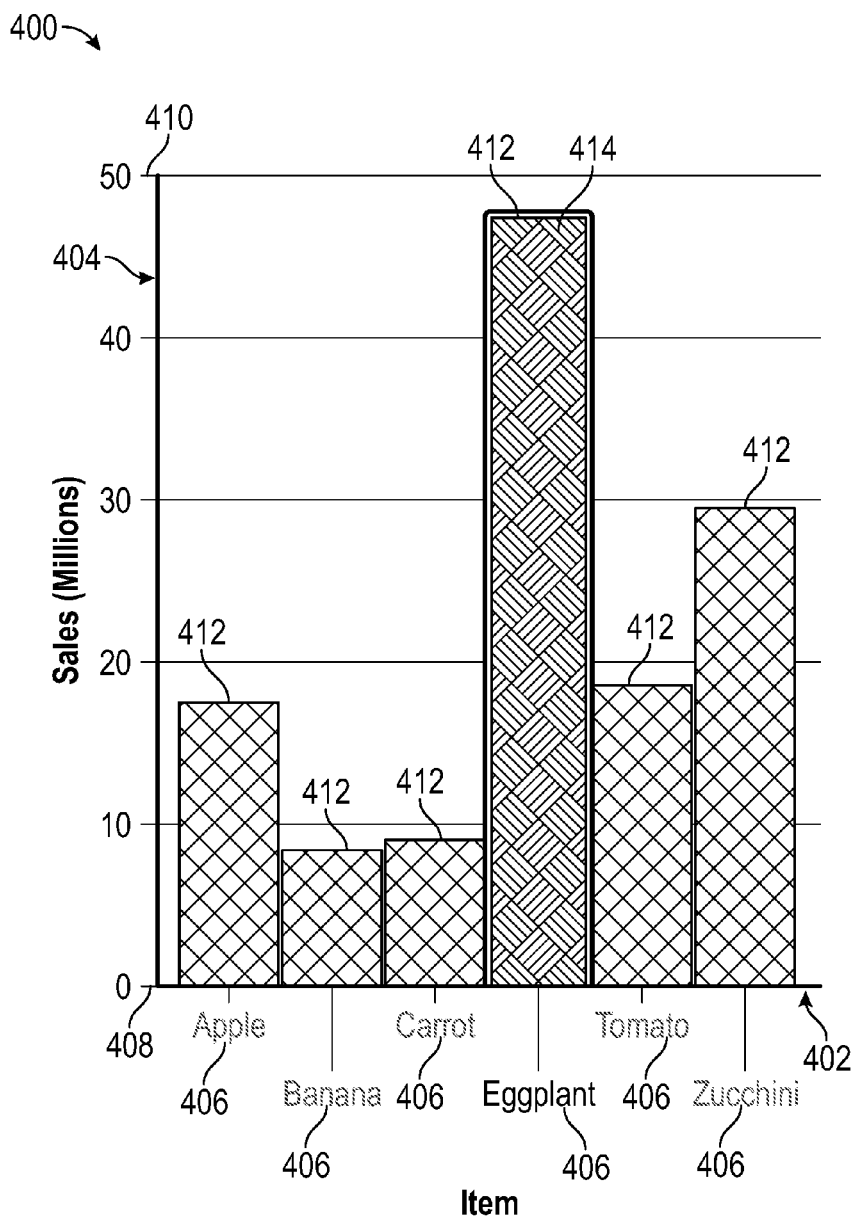

Referring again to FIG. 2, in an operation 202, an indicator of a subset of the data graphed in bar graph 300 is received. For example, referring to FIG. 4, a second bar graph 400 includes a first axis 402 and a second axis 404. In the illustrative orientation, first axis 402 of second bar graph 400 is in a horizontal direction and second axis 404 of second bar graph 400 is in a vertical direction. First axis 402 of second bar graph 400 includes a second plurality of category labels 406 distributed along first axis 402 of second bar graph 400. In the illustrative embodiment, the second plurality of category labels 406 is a type of food. Second axis 404 of second bar graph 400 includes a second minimum value 408 and a second maximum value 410. In the illustrative embodiment, second minimum value 408 is zero and second maximum value 410 is 50, and the discrete values represent total average sales of the type of food in millions of dollars.

Second bar graph 400 further includes a second plurality of value markers 412. In the illustrative embodiment, the second plurality of value markers 412 are bars having a height in the vertical direction that corresponds to the second axis value of the respective category value. For example, a second value marker 414 indicates an average sales value of approximately 48 million for a category value of "Eggplant".

In the illustrative embodiment, the indicator may indicate a selection by a user of second value marker 414. As understood by a person of skill in the art, the user may select second value marker 414 by touching display 120, moving a cursor using mouse 118 until it hovers over a portion of second value marker 414 and depressing a mouse button of mouse 118, moving a selector using keyboard 116 until selection of second value marker 414 is indicated and depressing a key on keyboard 116, etc. Once selected, second value marker 414 may be highlighted, as shown with reference to FIG. 4, by darkening a fill color, changing a fill pattern, darkening a border, etc. Data visualization application 112 receives the indicator that indicates a filter parameter of "Eggplant".

As another example, the indicator may be received when the user selects an additional filter parameter using a user interface presented under control of data visualization application 112. As yet another example, the indicator may be received when the user selects a subset of data items in dataset 114 manually by selecting one or more rows.

Referring again to FIG. 2, in an operation 204, a proportional value is determined based on the identified subset of the data graphed in bar graph 300, i.e., the subset that includes "Eggplant". Each value marker of the plurality of value markers 312 is analyzed to determine what proportion of sales is based on sales of "Eggplant".

In an operation 206, a determination is made concerning whether or not the proportional value determined for each of the plurality of value markers 312 fits within a current scale defined by minimum value 308 and maximum value 310. If the proportional values fit within the current scale, processing continues in an operation 208. If the proportional values do not fit within the current scale, processing continues in an operation 210.

Figure 5:
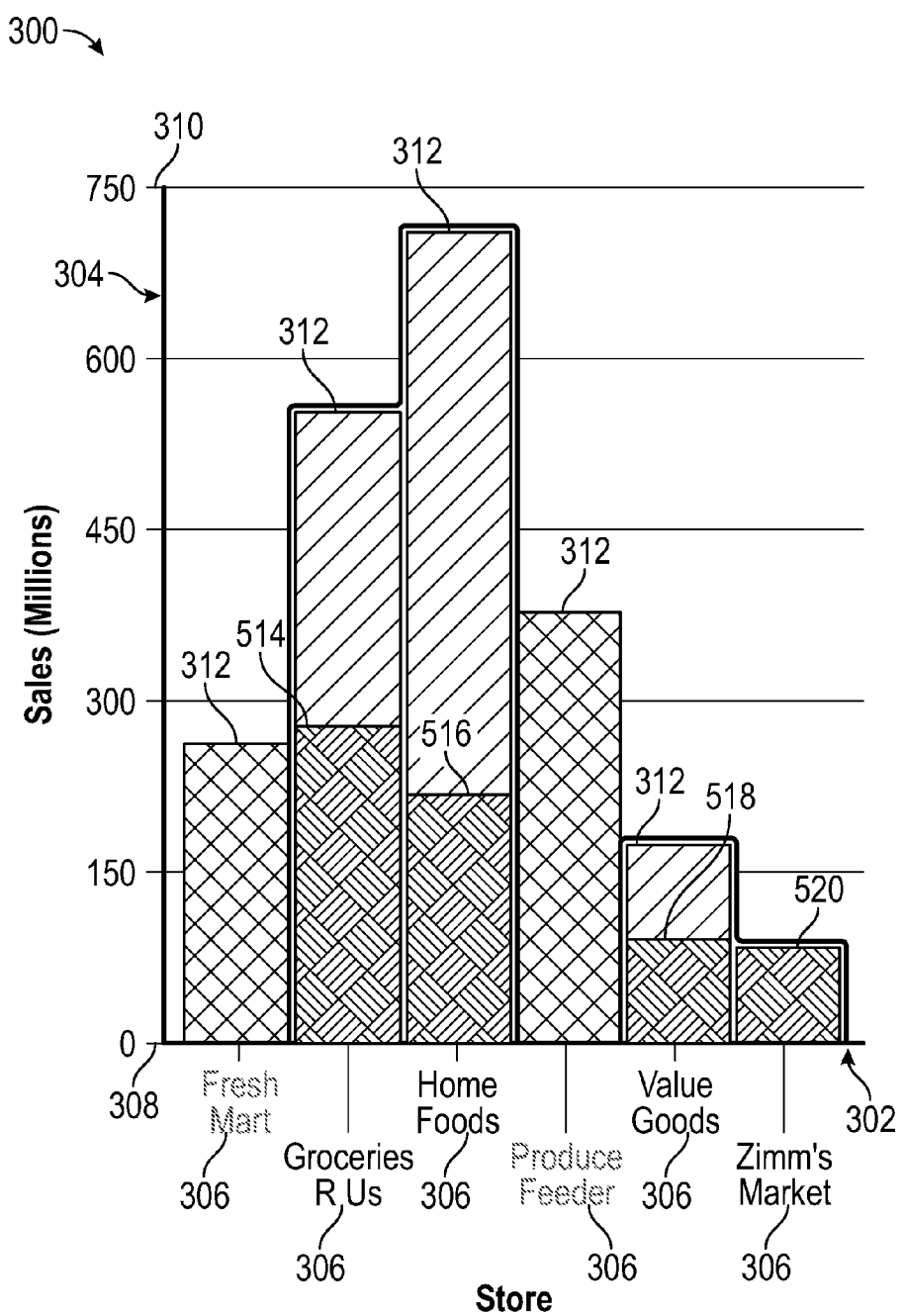

In operation 208, a new value marker is presented on the graph. For example, referring to FIG. 5, a third value marker 514, a fourth value marker 516, a fifth value marker 518, and a sixth value marker 520 are overlaid on the plurality of value markers 312 and a new value markers presented on the graph. Third value marker 514 indicates the proportional value of sales associated with sales of "Eggplant" for a category value (grocery store chain) of "Groceries R Us". Fourth value marker 516 indicates the proportional value associated with sales of "Eggplant" for a category value (grocery store chain) of "Home Foods". Fifth value marker 518 indicates the proportional value associated with sales of "Eggplant" for a category value (grocery store chain) of "Value Goods". Sixth value marker 520 indicates the proportional value associated with sales of "Eggplant" for a category value (grocery store chain) of "Zimm's Market". Each of third value marker 514, fourth value marker 516, fifth value marker 518, and sixth value marker 520 are associated with values that are between minimum value 308 and maximum value 310.

In operation 210, a determination is made concerning whether or not the proportional value determined for each of the plurality of value markers 312 is greater than maximum value 310. If the proportional values are greater than maximum value 310, processing continues in an operation 212. If the proportional values are not greater than maximum value 310, processing continues in an operation 214.

Figure 6:
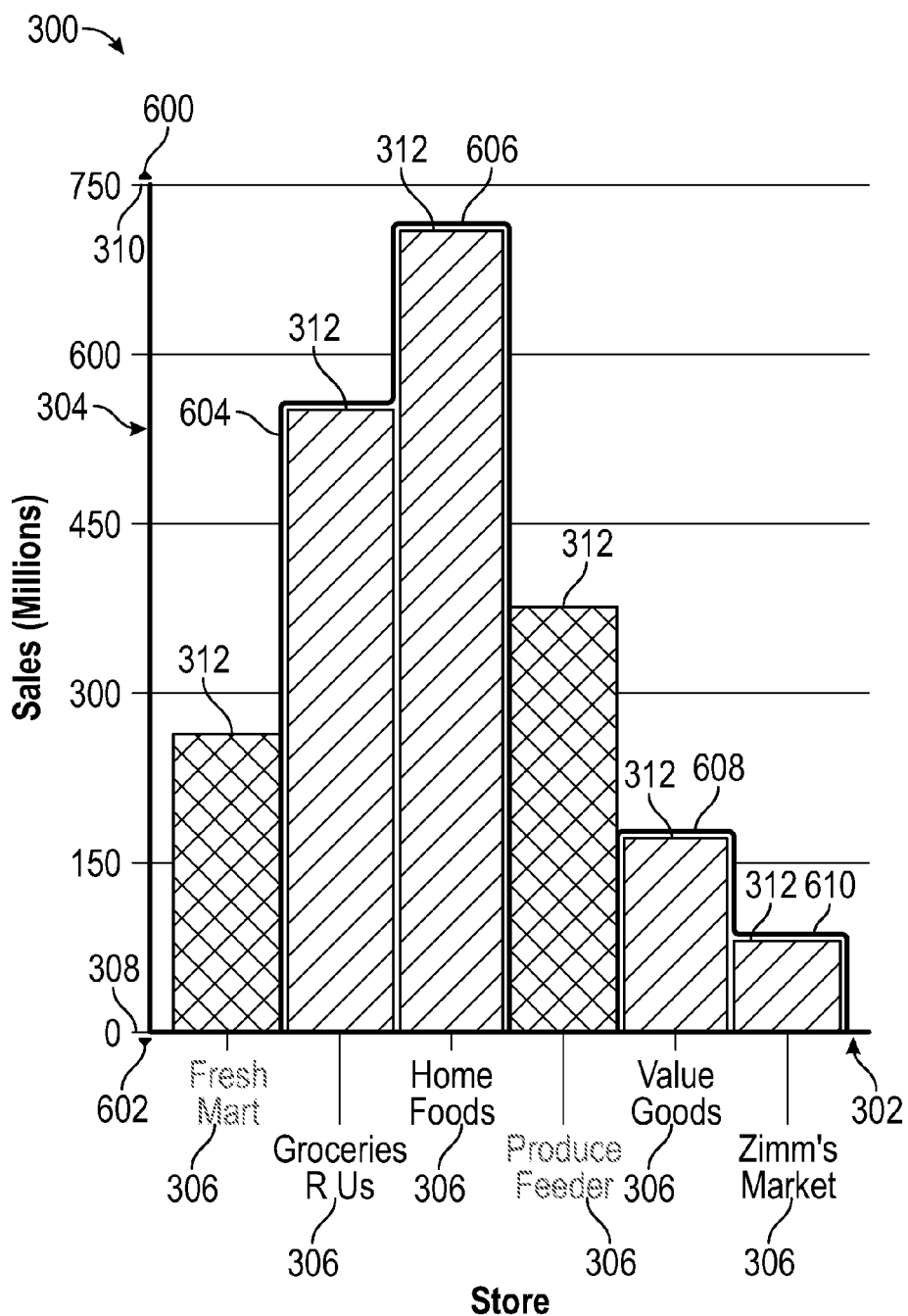

In operation 212, a greater than scale adjustment marker is presented on the graph without adjusting second axis 304. For example, referring to FIG. 6, a first scale adjustment marker 600 and a second scale adjustment marker 602 are overlaid on bar graph 300. In the illustrative embodiment, first scale adjustment marker 600 and second scale adjustment marker 602 have an arrowhead shape though other shapes, textual indicators, etc. may be used. In the illustrative embodiment, first scale adjustment marker 600 and second scale adjustment marker 602 are presented in association with second axis 304. For example, first scale adjustment marker 600 is presented in association with maximum value 310 of second axis 304 to indicate that at least one proportional value of the plurality of value markers 312 exceeds maximum value 310. First scale adjustment marker 600 is not shown if none of the proportional values of the plurality of value markers 312 exceed maximum value 310.

Referring again to FIG. 2, in operation 214, a determination is made concerning whether or not the proportional value determined for each of the plurality of value markers 312 is less than minimum value 308. If the proportional values are less than minimum value 308, processing continues in an operation 216. If the proportional values are not less than minimum value 308, processing continues in an operation 218.

In operation 216, a less than scale adjustment indicator is presented on the graph without adjusting second axis 304. For example, referring again to FIG. 6, second scale adjustment marker 602 is presented in association with minimum value 308 of second axis 304 to indicate that at least one proportional value of the plurality of value markers 312 is less than minimum value 308. Second scale adjustment marker 602 is not shown if none of the proportional values of the plurality of value markers 312 are less than minimum value 308.

A first highlighted bar 604, a second highlighted bar 606, a third highlighted bar 608, and a fourth highlighted bar 610 are overlaid on the plurality of value markers 312 of bar graph 300 to indicate that a proportion of sales associated with sales of "Eggplant" for the associated category values, "Groceries R Us", "Home Foods", "Value Goods", and "Zimm's Market", respectively, is effected by the subset of data identified by the indicator received in operation 202.

Figure 7:
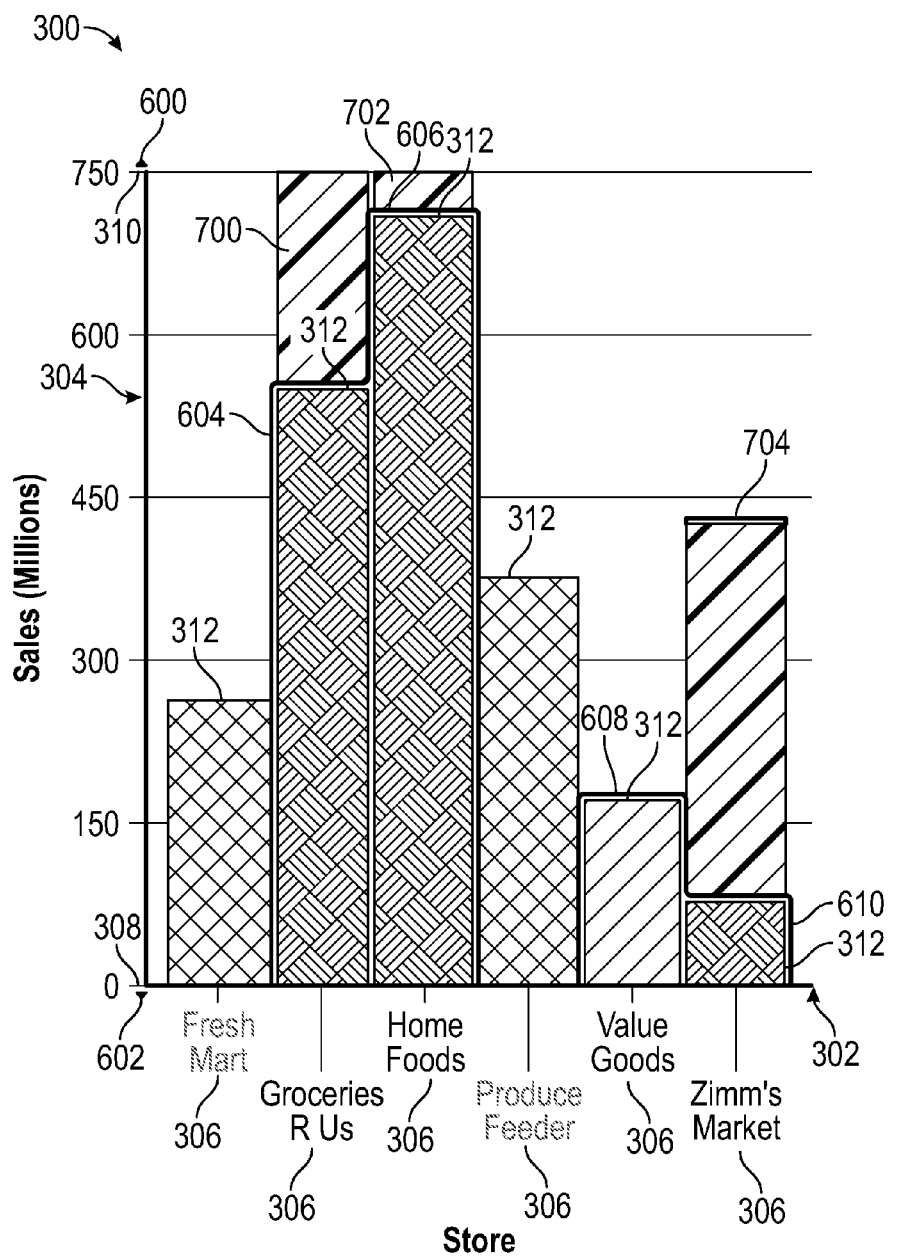

As another example, referring to FIG. 7, a fifth highlighted bar 700 and a sixth highlighted bar 702 are further overlaid on the plurality of value markers 312 of bar graph 300 to indicate that the proportion of sales associated with sales of "Eggplant" for the associated category values, "Groceries R Us" and "Home Foods", respectively, exceed maximum value 310. A seventh value marker 704 is further overlaid on the plurality of value markers 312 of bar graph 300 to indicate the proportion of sales associated with sales of "Eggplant" for the associated category value "Zimm's Market" is between minimum value 308 and maximum value 310.

Figure 8:
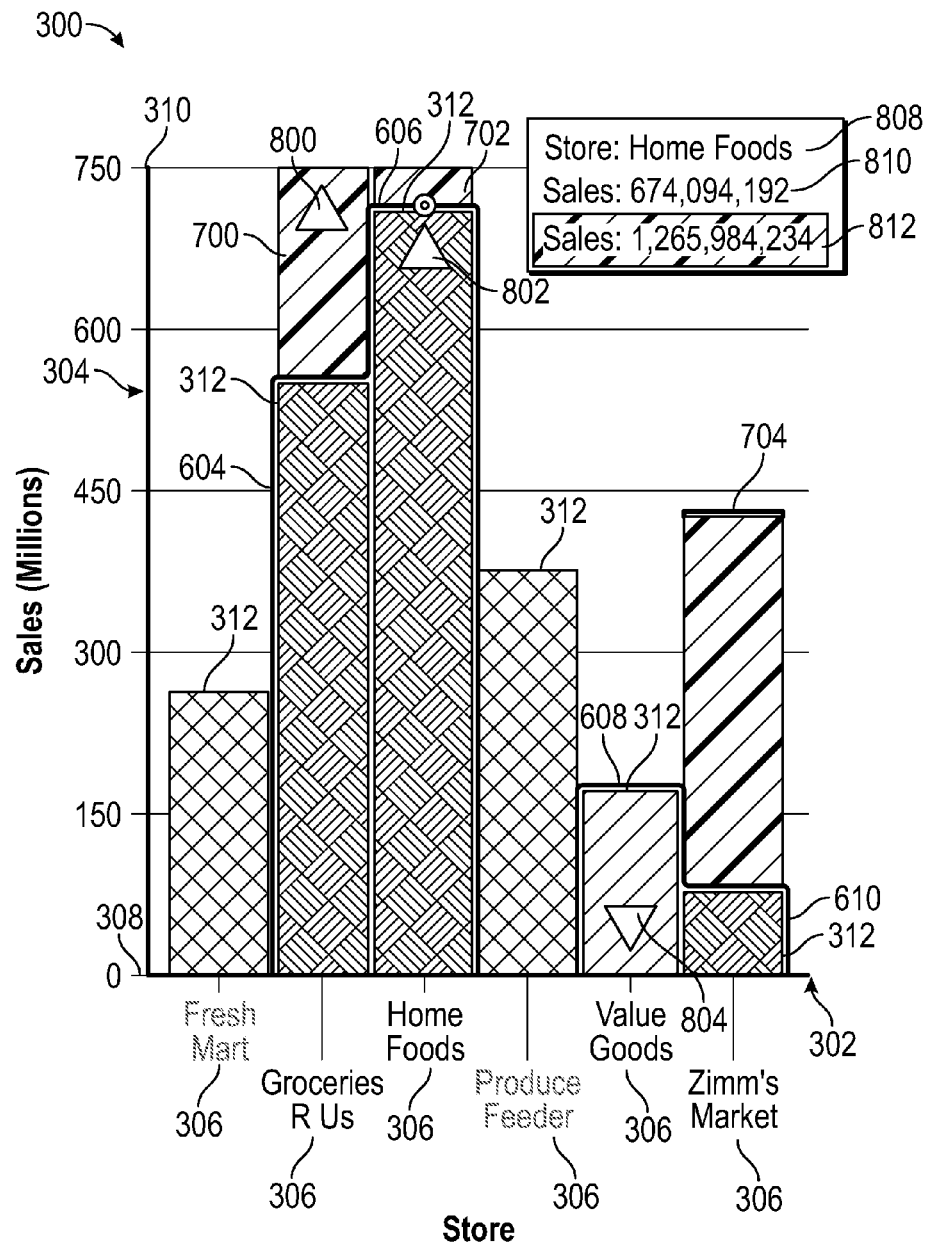

As yet another example, referring to FIG. 8, instead of first scale adjustment marker 600 and second scale adjustment marker 602, a third scale adjustment marker 800, a fourth scale adjustment marker 802, and a fifth scale adjustment marker 804 are overlaid on bar graph 300. Third scale adjustment marker 800 is overlaid on fifth highlighted bar 700 to indicate that the proportion of sales associated with sales of "Eggplant" for the associated category value, "Groceries R Us" exceeds maximum value 310. Fourth scale adjustment marker 802 is overlaid on sixth highlighted bar 702 to indicate that the proportion of sales associated with sales of "Eggplant" for the associated category value, "Home Foods" exceeds maximum value 310. Fifth scale adjustment marker 804 is overlaid on third highlighted bar 608 to indicate that the proportion of sales associated with sales of "Eggplant" for the associated category value, "Value Goods" is less than minimum value 308. An aggregated value may increase when a filter is applied for various reasons based on the type of data that is displayed. As an example, if the aggregated item includes items A, B, and C where the value for A is 10, the value for B is −10, and the value for C is 20, a sum of A, B, and C is 20. However, if a filter is applied that removes B from the visual, the new sum of A and C is 30. The new result to display increases from a value of 20 to a value of 30 that may not fit within the current axis scale. As another example, if the values of A, B, and C are 5, 10, and 15, respectively, an average of all three items is 10. If A is filtered out, the new average is 12.5. The new result to display increases from a value of 10 to a value of 12.5 that may not fit within the current axis scale.

Any of first scale adjustment marker 600, second scale adjustment marker 602, first highlighted bar 604, second highlighted bar 606, third highlighted bar 608, fourth highlighted bar 610, fifth highlighted bar 700, sixth highlighted bar 702, third scale adjustment marker 800, fourth scale adjustment marker 802, and fifth scale adjustment marker 804 may be considered scale adjustment markers.

In an operation 218, an indicator indicating selection of the scale adjustment marker is received. For example, any of first scale adjustment marker 600, second scale adjustment marker 602, first highlighted bar 604, second highlighted bar 606, third highlighted bar 608, fourth highlighted bar 610, fifth highlighted bar 700, sixth highlighted bar 702, third scale adjustment marker 800, fourth scale adjustment marker 802, and fifth scale adjustment marker 804 may be selected by the user using display 120, mouse 118, and/or keyboard 116 as discussed previously to trigger receipt of the second indicator by data visualization application 112. Display 120 may be a projector, a large screen monitor, a PC monitor, a wearable display device, a hand-held device, etc.

Figure 9:
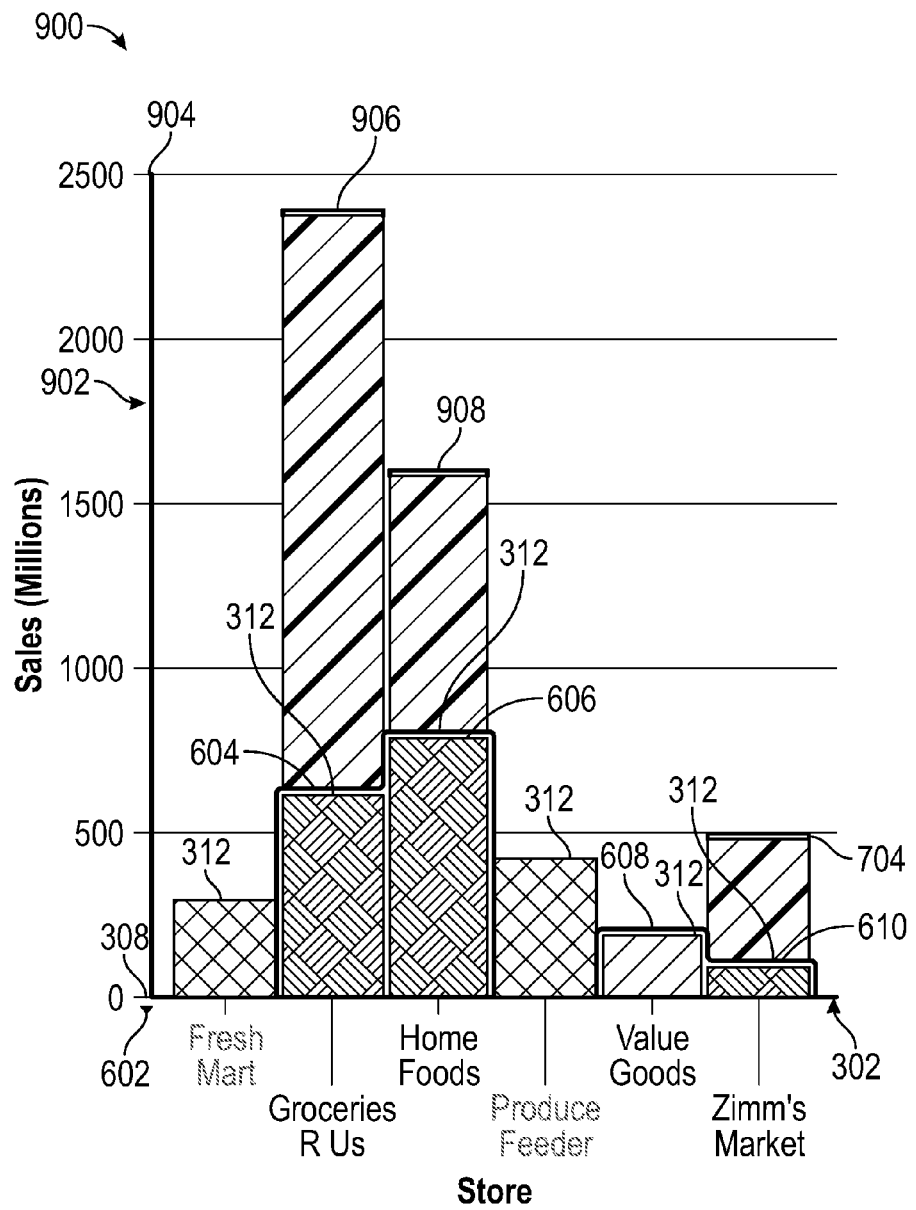

In an operation 220, in response to receipt of the scale adjustment marker, a second graph is presented on display 120 with an adjusted axis scale. For example, referring to FIG. 9, a third bar graph 900 is shown that includes first axis 302, a second axis 902, the plurality of category labels 306, and the plurality of value markers 312. Second axis 902 of third bar graph 900 includes minimum value 308 and a second maximum value 904 that is greater than maximum value 310. Relative to second axis 304 of bar graph 300, second axis 902 of third bar graph 900 has a larger scale to accommodate the value markers that exceeded maximum value 310.

Third bar graph 900 further includes an eighth value marker 906 overlaid on the plurality of value markers 312 to indicate the proportion of sales associated with sales of "Eggplant" for the associated category value "Groceries R Us" that is now between minimum value 308 and second maximum value 904. Third bar graph 900 still further includes a ninth value marker 908 overlaid on the plurality of value markers 312 to indicate the proportion of sales associated with sales of "Eggplant" for the associated category value "Home Foods" that is now between minimum value 308 and second maximum value 904.

As another example, in response to receipt of the scale adjustment marker, a numeric value associated with the second value marker overlaid on the graph is presented. For example, referring again to FIG. 8, a bubble 806 is presented when fourth scale adjustment marker 802 is selected using display 120, mouse 118, and/or keyboard 116. Bubble 806 includes a category value marker 808, a first numeric value marker 810, and a second numeric value marker 810. Category value marker 808 indicates the associated category value "Home Foods". First numeric value marker 810 indicates the sales associated with the category value "Home Foods" without considering the filter based on "Eggplant". Second numeric value marker 812 indicates the sales associated with the category value "Home Foods" considering the filter based on "Eggplant".

Data visualization application 112 may continue processing based on user interaction. For example, the user may select another filter parameter resulting in adjustments to the presented graph.

Figure 10:
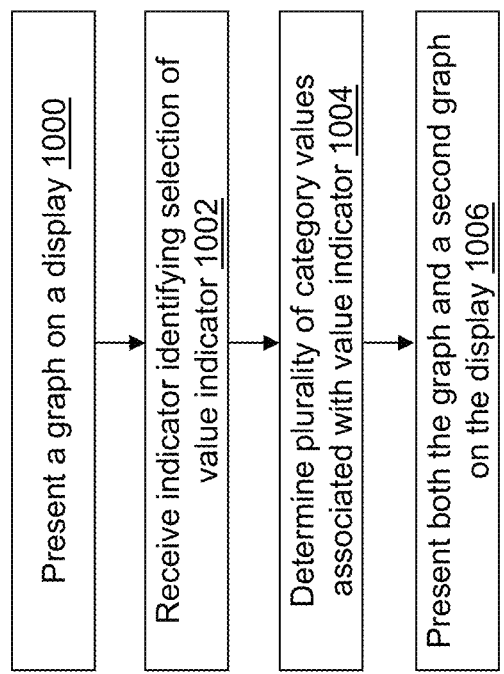
FIG. 10 depicts a flow diagram illustrating examples of operations performed by the data visualization device of FIG. 1 in accordance with a second illustrative embodiment.

Referring to FIG. 10, examples of operations performed by data visualization application 112 to provide visualization of dataset 114 that includes high-cardinality data are shown. In general, high-cardinality data is data that is difficult to present using visualizations such as bar charts and histograms. Data visualization application 112 provides an aggregated visualization alternative that may be used whenever a screen space provided for visualization on display 120 is insufficient. Referring to FIG. 10, example operations associated with data visualization application 112 are described in accordance with a second illustrative embodiment. Additional, fewer, or different operations may be performed depending on the embodiment. The order of presentation of the operations of FIG. 10 is not intended to be limiting. Although some of the operational flows are presented in sequence, the various operations may be performed in various repetitions, concurrently (in parallel, for example, using threads), and/or in other orders than those that are illustrated.

Similar to operation 200, in an operation 1000, a graph is presented on display 120. For example, the graph may be a histogram, a binned bar graph, a density plot graph, a kernel density estimation plot graph, or a bar graph as discussed previously.

Figure 11:
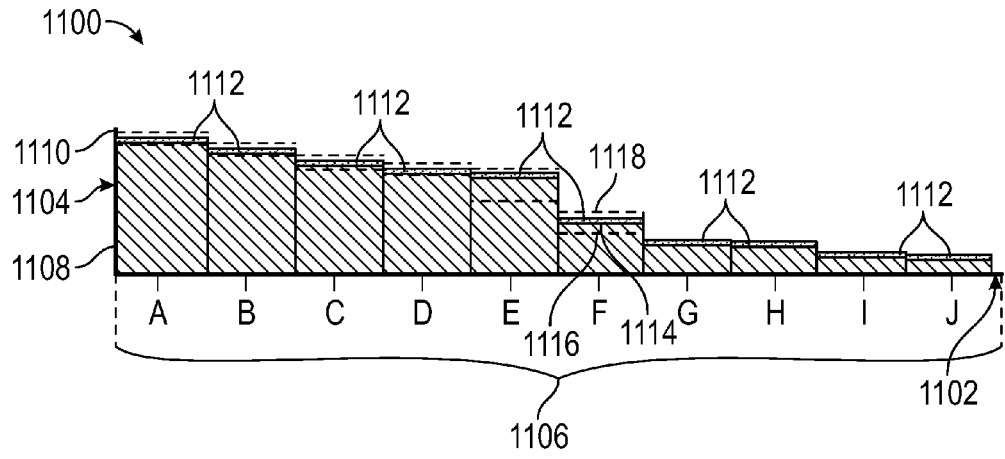
FIGS. 11-14 and 16 illustrate visualization of high-cardinality data performed by the data visualization device of FIG. 1 in accordance with illustrative embodiments.

For example, referring to FIG. 11, a binned bar graph 1100 is shown in accordance with an illustrative embodiment. A first axis 1102 of binned bar graph 1100 shows categories A-J that are being compared. A second axis 1104 of binned bar graph 1100 represents numeric values associated with the specific categories. In the illustrative orientation, first axis 1102 is in a horizontal direction and second axis 1104 is in a vertical direction.

First axis 1102 includes a plurality of category labels 1106 distributed along first axis 1102. Second axis 1104 includes a minimum value 1108 and a maximum value 1110 and represents a response value for the associated category value. First axis 1102 and second axis 1104 may be reversed in an alternative embodiment. Additionally, first axis 1102 may extend from maximum value 1110 of second axis 1104 in an alternative embodiment. Additionally, second axis 1104 may extend from an opposite end of first axis 1102 in an alternative embodiment.

Binned bar graph 1100 further includes a third plurality of value markers 1112. In the illustrative embodiment, the third plurality of value markers 1112 are bars having a height in the vertical direction that corresponds to an average second axis value of a respective category value. A minimum value marker and a maximum value marker are associated with each of the plurality of value markers 1112. For example, an average value marker 1114, a minimum value marker 1116, and a maximum value marker 1118 are associated with a category value "F". In alternative embodiments, the third plurality of value markers 1112 may indicate a minimum value, a maximum value, a mode value, a median value, a quartile value, a standard deviation value, etc.

In an operation 1002, an indicator indicating selection of a value marker is received. For example, any of the plurality of value markers 312, the second plurality of value markers 412, the third plurality of value markers 1112, fifth highlighted bar 700, sixth highlighted bar 702, seventh value marker 704, eighth value marker 906, and ninth value marker 908 may be selected by the user using display 120, mouse 118, and/or keyboard 116 as discussed previously to trigger receipt of the third indicator by data visualization application 112.

In an operation 1004, in response to receipt of the value marker, a second plurality of category values are determined based on the category value associated with the third indicator. For example, the category value is stored in association with the second plurality of category values that describe the content of the associated value marker.

Figure 12:
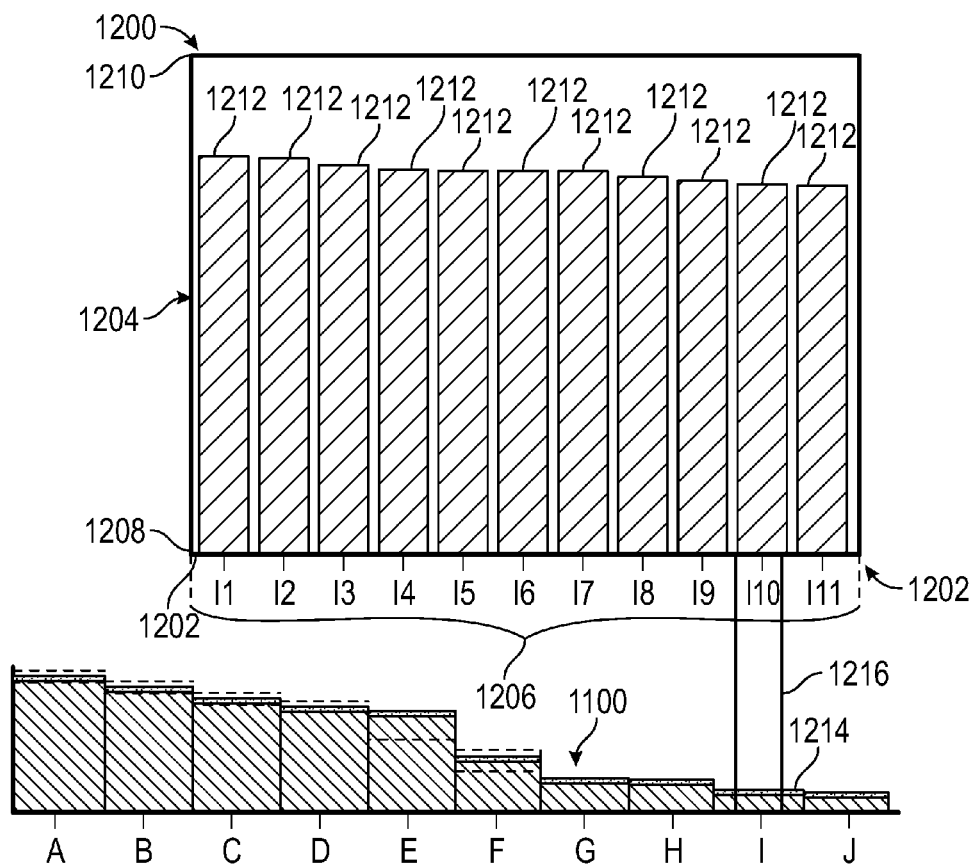

In an operation 1006, the graph and a third graph are presented on display 120. For example, referring to FIG. 12, binned bar graph 1100 and a fourth bar graph 1200 are presented on display 120 in accordance with an illustrative embodiment. Fourth bar graph 1200 includes a first axis 1202 and a second axis 1204. In the illustrative orientation, first axis 1202 of fourth bar graph 1200 is in a horizontal direction and second axis 1204 of fourth bar graph 1200 is in a vertical direction.

First axis 1202 of fourth bar graph 1200 includes a fourth plurality of category labels 1206 labeled I1-I11 and distributed along first axis 1202 of fourth bar graph 1200. Second axis 1204 of fourth includes a minimum value 1208 and a maximum value 1210 and represents a response value for the associated category value. Fourth bar graph 1200 further includes a fourth plurality of value markers 1212. In the illustrative embodiment, the fourth plurality of value markers 1212 are bars having a height in the vertical direction that corresponds to a second axis value of a respective category value.

First axis 1202 and second axis 1204 of fourth bar graph 1200 may be reversed in an alternative embodiment. Additionally, first axis 1202 may extend from maximum value 1210 of second axis 1204 in an alternative embodiment. Additionally, second axis 1204 may extend from an opposite end of first axis 1202 in an alternative embodiment. First axis 1202 of fourth bar graph 1200 is parallel to first axis 1102 of binned bar graph 1100 and perpendicular to second axis 1104 of binned bar graph 1100. Second axis 1204 of fourth bar graph 1200 is parallel to second axis 1104 of binned bar graph 1100 and perpendicular to first axis 1102 of binned bar graph 1100.

Fourth bar graph 1200 extends from a tenth value marker 1214 (selection of which triggered receipt of the third indicator in operation 1002) of binned bar graph 1100 using a first extender 1216. The fourth plurality of category labels 1206 is determined from the category label "I" associated with tenth value marker 1214. For example, category label "I" may be determined to include eleven subcategories I1-I11, which are presented on first axis 1202 of fourth bar graph 1200. Fourth bar graph 1200 shows additional detail from dataset 114 that is otherwise not visible in binned bar graph 1100 allowing the user to drill into dataset 114. The fourth plurality of value markers 1212 is associated with the determined fourth plurality of category labels 1206.

In the illustrative embodiment, first extender 1216 includes parallel lines that extend from tenth value marker 1214 in a first direction that connects with first axis 1202 and in a second direction that connects with second axis 1204 to form a boundary around fourth bar graph 1200 to associate fourth bar graph 1200 with tenth value marker 1214. In alternative embodiments, first extender 1216 may be a single line, a dashed line, a bar, etc.

Figure 13:
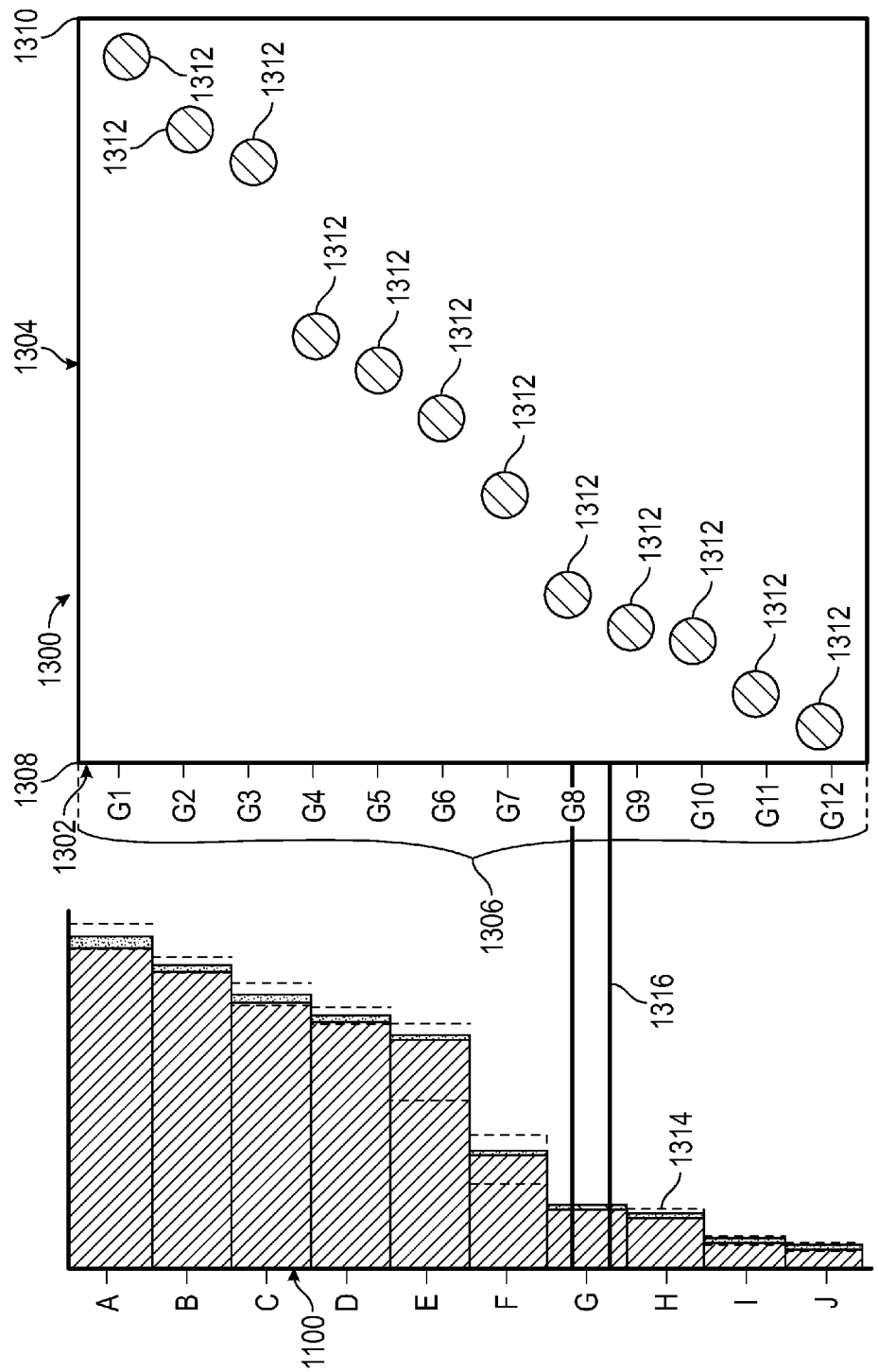

As another example, referring to FIG. 13, binned bar graph 1100 and a scatter plot 1300 are presented on display 120 in accordance with an illustrative embodiment. Scatter plot 1300 includes a first axis 1302 and a second axis 1304. In the illustrative orientation, first axis 1302 of scatter plot 1300 is in a vertical direction and second axis 1304 of scatter plot 1300 is in a horizontal direction.

First axis 1302 includes a fifth plurality of category labels 1306 labeled G1-G12 and distributed along first axis 1302. Second axis 1304 includes a minimum value 1308 and a maximum value 1310 and represents a response value for the associated category value. Scatter plot 1300 further includes a fifth plurality of value markers 1312. In the illustrative embodiment, the fifth plurality of value markers 1312 are dots that correspond to a second axis value of a respective category value.

First axis 1302 and second axis 1304 of scatter plot 1300 may be reversed in an alternative embodiment. Additionally, first axis 1302 may extend from maximum value 1310 of second axis 1304 in an alternative embodiment. Additionally, second axis 1304 may extend from an opposite end of first axis 1302 in an alternative embodiment. First axis 1302 of scatter plot 1300 is parallel to first axis 1102 of binned bar graph 1100 and perpendicular to second axis 1104 of binned bar graph 1100. Second axis 1304 of scatter plot 1300 is parallel to second axis 1104 of binned bar graph 1100 and perpendicular to first axis 1102 of binned bar graph 1100.

Scatter plot 1300 extends from an eleventh value marker 1314 (selection of which triggered receipt of the third indicator in operation 1002) of binned bar graph 1100 using a second extender 1316. The fifth plurality of category labels 1306 is determined from the category label "G" associated with eleventh value marker 1314. For example, category label "G" may be determined to include twelve subcategories G1-G12, which are presented on first axis 1302 of scatter plot 1300. Scatter plot 1300 shows additional detail from dataset 114 that is otherwise not visible in binned bar graph 1100 allowing the user to drill into dataset 114. The fifth plurality of value markers 1312 is associated with the determined fifth plurality of category labels 1306.

Figure 14:
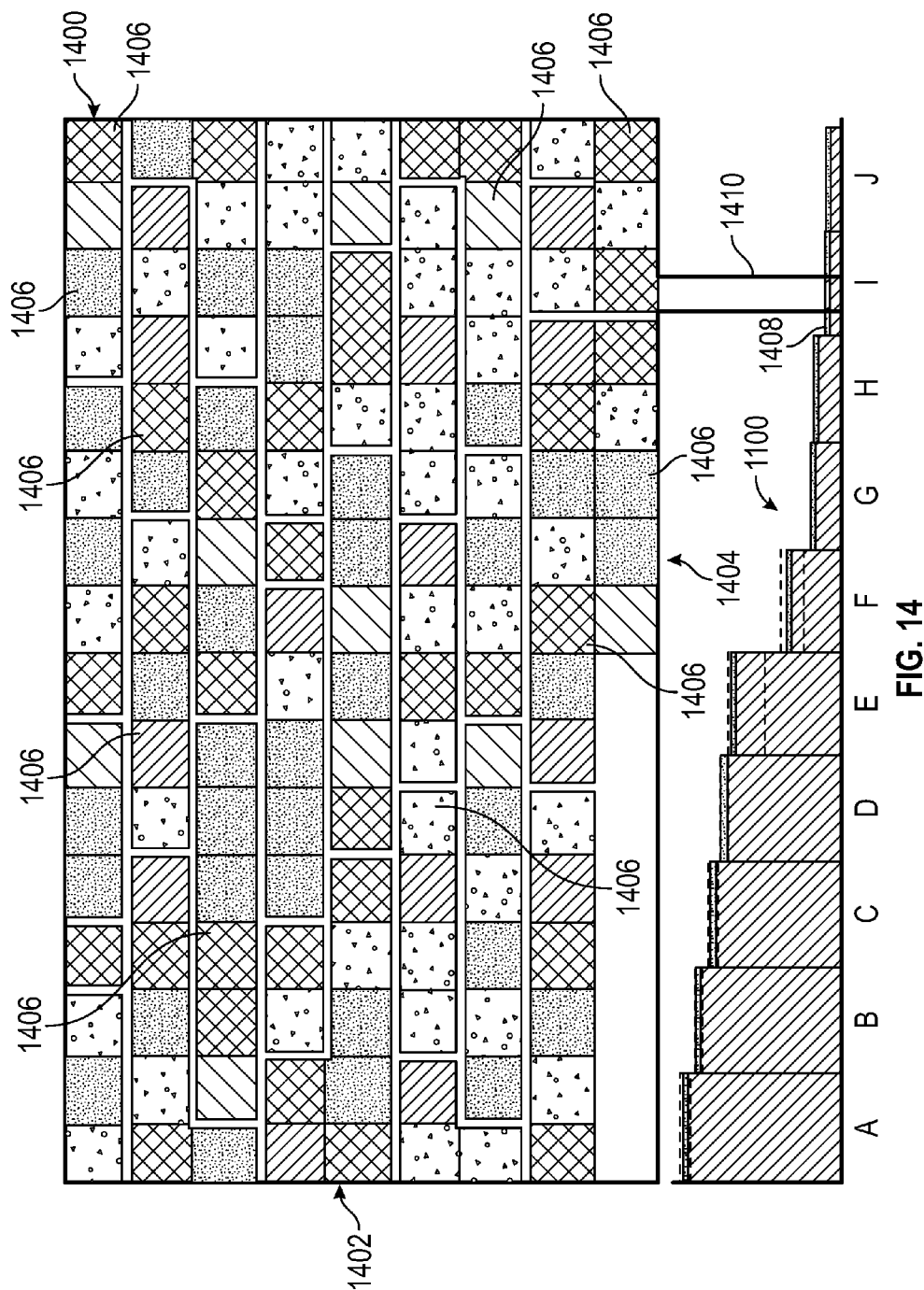

As yet another example, referring to FIG. 14, binned bar graph 1100 and a space filling chart 1400 are presented on display 120 in accordance with an illustrative embodiment. Space filling chart 1400 includes a sixth plurality of value markers 1406. In the illustrative embodiment, the sixth plurality of value markers 1406 are squares filled with a color that correspond to a value of a respective category value. The sixth plurality of value markers 1406 includes all of the squares though only a subset of the squares are indicated for legibility with each square acting as a marker. Various color schemes may be used. Space filling chart 1400 further includes a first axis 1402 and a second axis 1404. In the illustrative orientation, first axis 1402 of space filling chart 1400 is in a vertical direction, and second axis 1404 of space filling chart 1400 is in a horizontal direction. Referring to FIG. 14, first axis 1402 and second axis 1404 define boundaries within which the sixth plurality of value markers 1406 are arranged.

Space filling chart 1400 extends from a twelfth value marker 1408 (selection of which triggered receipt of the third indicator in operation 1002) of binned bar graph 1100 using a third extender 1410. The sixth plurality of value markers 1406 is determined from the category label "I" associated with twelfth value marker 1408. Space filling chart 1400 shows additional detail from dataset 114 that is otherwise not visible in binned bar graph 1100 allowing the user to drill into dataset 114. For example, the sixth plurality of value markers 1406 show values associated with the 136 sub-category members of the category label "I" associated with twelfth value marker 1408 where the color may be selected to represent the value.

Figure 15:
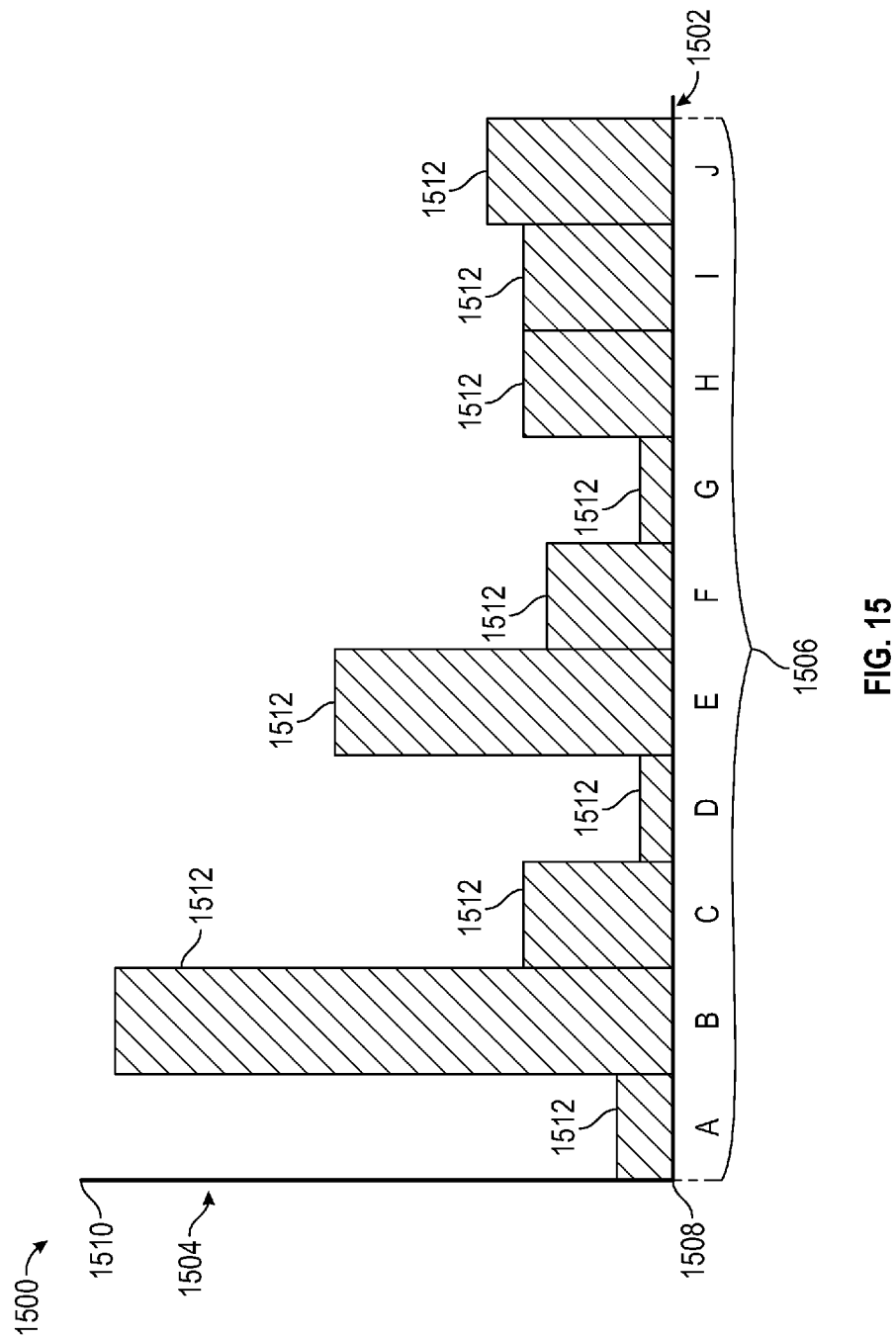
FIG. 15 illustrates a histogram in accordance with an illustrative embodiment.

Referring to FIG. 15, a histogram 1500 is shown in accordance with an illustrative embodiment. A first axis 1502 of histogram 1500 shows categories A-J that are being compared. A second axis 1504 of histogram 1500 represents numeric frequency values associated with the specific categories. In the illustrative orientation, first axis 1502 of histogram 1500 is in a horizontal direction and second axis 1504 of histogram 1500 is in a vertical direction. First axis 1502 and second axis 1504 of histogram 1500 may be positioned in different orientations as discussed previously relative to bar graph 300.

First axis 1502 of histogram 1500 includes a seventh plurality of category labels 1506 distributed along first axis 1502. Second axis 1504 of histogram 1500 includes a minimum value 1508 and a maximum value 1510 and represents a frequency response value for the associated category value.

Histogram 1500 further includes a seventh plurality of value markers 1512. In the illustrative embodiment, the seventh plurality of value markers 1512 are bars having a height in the horizontal direction that corresponds to a frequency value of a respective category value.

Other graph combinations can be created. For example, binned bar graph 1100 can be combined with histogram 1500 to show the detailed view. As another example, histogram 1500 can combined with scatter plot 1300, space filling chart 1400, or another histogram to show the detailed view.

Figure 16:
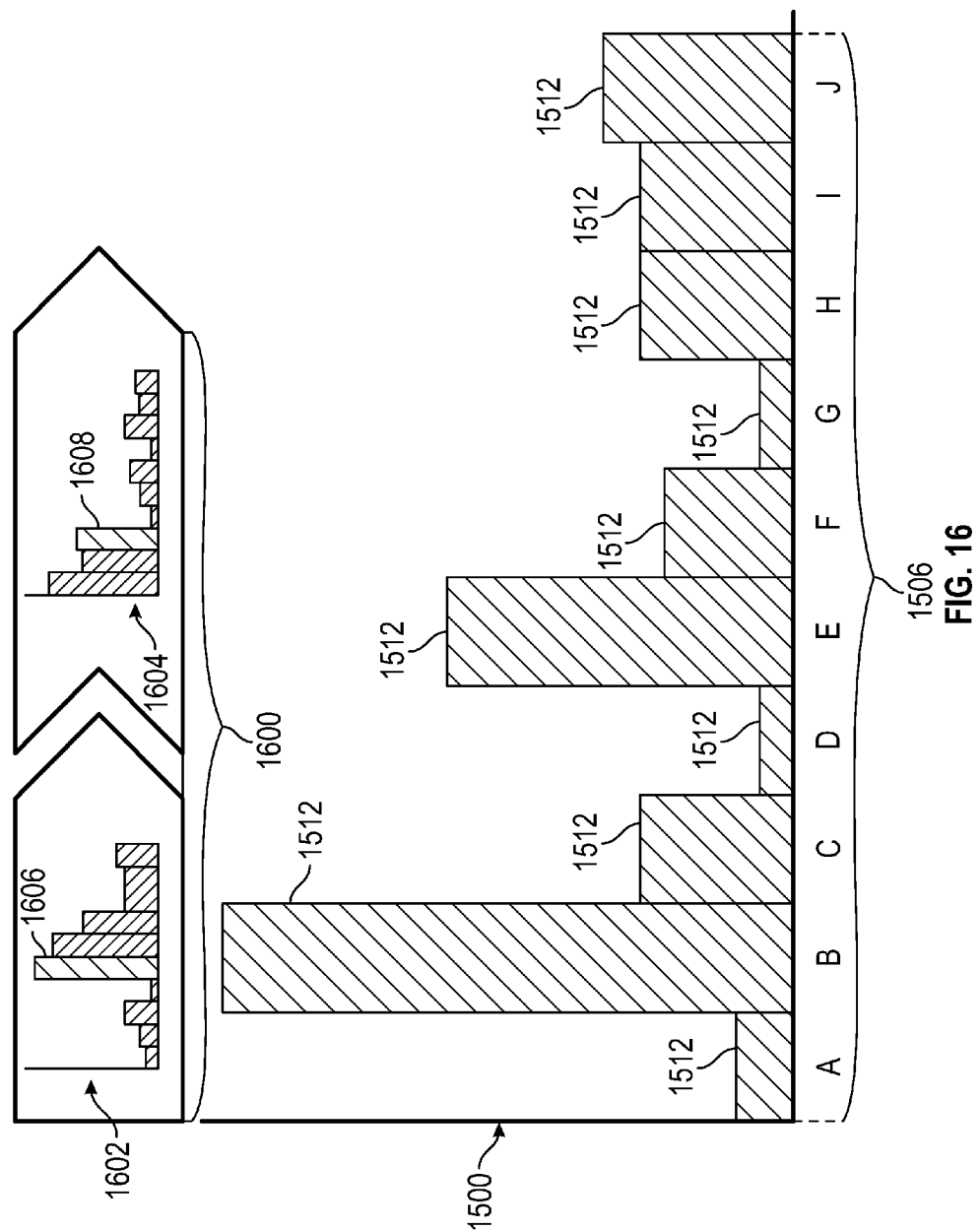

As still another example, referring to FIG. 16, a breadcrumb 1600 and histogram 1500 are presented on display 120 in accordance with an illustrative embodiment. Breadcrumb 1600 may include a first histogram 1602 and a second histogram 1604. Fewer or additional histograms may be included in breadcrumb 1600. First histogram 1602 was presented on display 120. A fourteenth value marker 1606 was selected by the user. In response, second histogram 1604 was presented on display 120. A fifteenth value marker 1608 was selected triggering presentation of histogram 1500. Second histogram 1604 was removed from display 120 and added to breadcrumb 1600 above histogram 1500 to indicate that fifteenth value marker 1608 was selected by the user. Second histogram 1604 is reduced in size when added to breadcrumb 1600. Seventh plurality of category labels 1506 is determined from the category values associated with fifteenth value marker 1608.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

Though shown in the illustrative embodiment as executing on a single computing device, a plurality of computing devices may be used that are networked in various ways as understood by a person of skill in the art. The computing environment may be an environment within which parallelized computing may be performed such as using a multi-node Hadoop® cluster, a grid of computers, a client-server based system, etc. Apache™ Hadoop® is an open-source software framework for distributed computing. As another example, the SAS® LASR Analytic Server functions as an analytic platform that provides speedy, secure, multi-user access to in-memory data in a distributed computing environment. The server also handles smaller data sets and supports an alternate, single-machine configuration.

The distributed computing environment may involve any number or arrangement of computers configured to support parallelized computing. Thus, for example, the environment may involve any number of computers, processors, or multi-threaded processors configured to perform computations in parallel, and in accordance with commands and synchronization provided by a controlling thread, processor, or other computing platforms.

Any or all of the computing entities may have access to and/or store all or a portion of dataset 114 as understood by a person of skill in the art. Dataset 114 may have any size and may be distributed across one or more computing devices in the distributed computing environment.

Data visualization application 112 may provide additional functionality beyond those described herein. As an example, data visualization application 112 may reference functionality provided as part of an integrated visualization software application such the SAS® Visual Analytics software application offered by SAS Institute Inc. as well as those offered by other software vendors.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable medium having stored thereon computer-readable instructions that when executed by a computing device cause the computing device to:
   present a graph on a display,
      wherein the graph includes a first axis, a second axis, and a first plurality of value markers,
      wherein the first axis includes a minimum value and a maximum value and the second axis includes a plurality of category values,
      wherein each value marker of the first plurality of value markers indicates an aggregate value representing a respective category value of the plurality of category values;
   receive a selection indicator identifying selection of a first value marker of the first plurality of value markers,
      wherein the first value marker indicates the aggregate value for a category value of the plurality of category values associated with the first value marker;
   automatically identify a second plurality of category values in response to receipt of the selection indicator,
      wherein the second plurality of category values are subcategories of the category value of the selected first value marker;
   in response to automatically identifying the second plurality of category values, automatically compute a value for each respective subcategory value of the second plurality of category values from the aggregate value indicated by the first value marker; and
   automatically present both the graph including each value marker of the first plurality of value markers and a second graph together on the display,
      wherein the second graph includes a third axis, a fourth axis, and a second plurality of value markers distinct from the first plurality of value markers,
      wherein each value marker of the second plurality of value markers indicates the computed value associated with a respective subcategory value of the second plurality of category values.

2. The computer-readable medium of claim 1, wherein the second plurality of value markers are not visible until the second graph is presented on the display.

3. The computer-readable medium of claim 1, wherein the category value is stored in association with the second plurality of category values.

4. The computer-readable medium of claim 1, wherein the second graph extends from the first value marker on the graph.

5. The computer-readable medium of claim 4, wherein the first axis is presented in a horizontal direction, and the second axis is presented in a vertical direction relative to the first axis, wherein the third axis is parallel to the first axis and the fourth axis is parallel to the second axis.

6. The computer-readable medium of claim 4, wherein the first axis is presented in a horizontal direction, and the second axis is presented in a vertical direction relative to the first axis, wherein the fourth axis is parallel to the first axis and the third axis is parallel to the second axis.

7. The computer-readable medium of claim 4, wherein the first axis is presented in a vertical direction, and the second axis is presented in a horizontal direction relative to the first axis, wherein the third axis is parallel to the first axis and the fourth axis is parallel to the second axis.

8. The computer-readable medium of claim 4, wherein the first axis is presented in a vertical direction, and the second axis is presented in a horizontal direction relative to the first axis, wherein the fourth axis is parallel to the first axis and the third axis is parallel to the second axis.

9. The computer-readable medium of claim 4, wherein the computer-readable instructions further cause the computing device to remove the presented graph from the display after receiving the selection indicator and to present the graph on the display reduced in size after removing the graph.

10. The computer-readable medium of claim 9, wherein a graph type of the graph is a histogram.

11. The computer-readable medium of claim 10, wherein a graph type of the second graph is selected from the group consisting of a histogram, a bar graph, a space filling chart, and a scatter plot.

12. The computer-readable medium of claim 4, wherein a graph type of the graph is selected from the group consisting of a histogram, a binned bar graph, and a bar graph.

13. The computer-readable medium of claim 4, wherein a graph type of the graph is a binned bar graph, wherein the binned bar graph comprises a bar graph that includes a mean indicator, a minimum indicator, and a maximum indicator for each category value of the plurality of category values, wherein the mean indicator indicates an average value for each category value of the plurality of category values, the minimum indicator indicates a minimum value for each category value of the plurality of category values, and the maximum indicator indicates a maximum value for each category value of the plurality of category values.

14. The computer-readable medium of claim 4, wherein a graph type of the second graph is selected from the group consisting of a histogram, a bar graph, a space filling chart, and a scatter plot.

15. The computer-readable medium of claim 4, wherein the computer-readable instructions further cause the computing device to remove the presented graph from the display after receiving the selection indicator and to present the graph on the display in a reversed orientation after removing the graph.

16. A system comprising:
a processor; and
a non-transitory computer-readable medium operably coupled to the processor, the computer-readable medium having computer-readable instructions stored thereon that, when executed by the processor, cause a computing device to
present a graph on a display,
wherein the graph includes a first axis, a second axis, and a first plurality of value markers,
wherein the first axis includes a minimum value and a maximum value and the second axis includes a plurality of category values,
wherein each value marker of the first plurality of value markers indicates an aggregate value representing a respective category value of the plurality of category values;
receive a selection indicator identifying selection of a first value marker of the first plurality of value markers,
wherein the first value marker indicates the aggregate value for a category value of the plurality of category values associated with the first value marker;
automatically identify a second plurality of category values in response to receipt of the selection indicator,
wherein the second plurality of category values are subcategories of the category value of the selected first value marker;
in response to automatically identifying the second plurality of category values, automatically compute a value for each respective subcategory value of the second plurality of category values from the aggregate value indicated by the first value marker; and
automatically present both the graph including each value marker of the first plurality of value markers and a second graph together on the display,
wherein the second graph includes a third axis, a fourth axis, and a second plurality of value markers distinct from the first plurality of value markers,
wherein each value marker of the second plurality of value markers indicates the computed value associated with a respective subcategory value of the second plurality of category values.

17. The system of claim 16, wherein the second plurality of value markers are not visible until the second graph is presented on the display.

18. The system of claim 16, wherein the second graph extends from the first value marker on the graph.

19. The system of claim 18, wherein the first axis is presented in a horizontal direction, and the second axis is presented in a vertical direction relative to the first axis, wherein the third axis is parallel to the first axis and the fourth axis is parallel to the second axis.

20. The system of claim 18, wherein the first axis is presented in a horizontal direction, and the second axis is presented in a vertical direction relative to the first axis, wherein the fourth axis is parallel to the first axis and the third axis is parallel to the second axis.

21. The system of claim 18, wherein the first axis is presented in a vertical direction, and the second axis is presented in a horizontal direction relative to the first axis, wherein the third axis is parallel to the first axis and the fourth axis is parallel to the second axis.

22. The system of claim 18, wherein the first axis is presented in a vertical direction, and the second axis is presented in a horizontal direction relative to the first axis, wherein the fourth axis is parallel to the first axis and the third axis is parallel to the second axis.

23. The system of claim 18, wherein the computer-readable instructions further cause the computing device to remove the presented graph from the display after receiving the selection indicator and to present the graph on the display reduced in size after removing the graph.

24. A method of visualizing high-cardinality data, the method comprising:
presenting a graph on a display,
wherein the graph includes a first axis, a second axis, and a first plurality of value markers,
wherein the first axis includes a minimum value and a maximum value and the second axis includes a plurality of category values,
wherein each value marker of the first plurality of value markers indicates an aggregate value representing a respective category value of the plurality of category values;
receiving a selection indicator identifying selection of a first value marker of the first plurality of value markers,
wherein the first value marker indicates the aggregate value for a category value of the plurality of category values associated with the first value marker;
automatically identifying, by a computing device, a second plurality of category values in response to receipt of the selection indicator,
wherein the second plurality of category values are subcategories of the category value of the selected first value marker;
in response to automatically identifying the second plurality of category values, automatically computing, by the computing device, a value for each respective subcategory value of the second plurality of category values from the aggregate value indicated by the first value marker; and
automatically presenting both the graph including each value marker of the first plurality of value markers and a second graph together on the display,
wherein the second graph includes a third axis, a fourth axis, and a second plurality of value markers distinct from the first plurality of value markers,
wherein each value marker of the second plurality of value markers indicates the computed value associated with a respective subcategory value of the second plurality of category values.

25. The method of claim 24, wherein the second plurality of value markers are not visible until the second graph is presented on the display.

26. The method of claim 24, wherein the second graph extends from the first value marker on the graph.

27. The method of claim 26, wherein the first axis is presented in a horizontal direction, and the second axis is presented in a vertical direction relative to the first axis, wherein the third axis is parallel to the first axis and the fourth axis is parallel to the second axis.

28. The method of claim 26, wherein the first axis is presented in a horizontal direction, and the second axis is presented in a vertical direction relative to the first axis, wherein the fourth axis is parallel to the first axis and the third axis is parallel to the second axis.

29. The method of claim 26, wherein the first axis is presented in a vertical direction, and the second axis is presented in a horizontal direction relative to the first axis, wherein the third axis is parallel to the first axis and the fourth axis is parallel to the second axis.

30. The method of claim 26, wherein the first axis is presented in a vertical direction, and the second axis is presented in a horizontal direction relative to the first axis, wherein the fourth axis is parallel to the first axis and the third axis is parallel to the second axis.

31. The method of claim 26, wherein the presented graph is removed from the display after receiving the selection indicator and presented on the display reduced in size after being removed.

32. The method of claim 26, wherein the presented graph is removed from the display after receiving the selection indicator and presented on the display reversed in orientation after being removed.

* * * * *